(12) United States Patent
Lesur

(10) Patent No.: US 9,844,970 B2
(45) Date of Patent: Dec. 19, 2017

(54) SECURE LASER MARKING PERSONALISATION

(71) Applicant: Gemalto SA, Meudon (FR)

(72) Inventor: Jean-Luc Lesur, Meudon (FR)

(73) Assignee: GEMALTO SA, Meudon (FR)

( * ) Notice: Subject to any disclaimer, the term of this patent is extended or adjusted under 35 U.S.C. 154(b) by 105 days.

(21) Appl. No.: 14/651,028

(22) PCT Filed: Dec. 10, 2013

(86) PCT No.: PCT/EP2013/076071
§ 371 (c)(1),
(2) Date: Jun. 10, 2015

(87) PCT Pub. No.: WO2014/090797
PCT Pub. Date: Jun. 19, 2014

(65) Prior Publication Data
US 2017/0015131 A1     Jan. 19, 2017

(30) Foreign Application Priority Data

Dec. 10, 2012  (EP) .................................. 12306555

(51) Int. Cl.
| | |
|---|---|
| *B42D 25/405* | (2014.01) |
| *B42D 25/435* | (2014.01) |
| *B42D 25/41* | (2014.01) |
| *B42D 25/342* | (2014.01) |
| *B42D 25/382* | (2014.01) |

(Continued)

(52) U.S. Cl.
CPC .............. *B42D 25/41* (2014.10); *B41F 23/08* (2013.01); *B41J 11/002* (2013.01); *B41M 3/144* (2013.01); *B41M 5/24* (2013.01); *B42D 25/337* (2014.10); *B42D 25/342* (2014.10); *B42D 25/382* (2014.10); *B42D 25/387* (2014.10); *B42D 25/405* (2014.10); *B42D 25/435* (2014.10); *B23K 26/00* (2013.01); *B41M 3/14* (2013.01)

(58) Field of Classification Search
CPC ........................... B42D 25/405; B42D 25/435
See application file for complete search history.

(56) References Cited

U.S. PATENT DOCUMENTS

| | | | | |
|---|---|---|---|---|
| 8,403,367 B2 * | 3/2013 | Patton | .................... | B42D 25/29 |
| | | | | 283/74 |
| 2006/0141391 A1 * | 6/2006 | Klein | .................... | B42D 25/29 |
| | | | | 430/270.1 |

(Continued)

FOREIGN PATENT DOCUMENTS

| | | |
|---|---|---|
| WO | WO2011124920 A1 | 10/2011 |
| WO | WO2011161661 A2 | 12/2011 |

OTHER PUBLICATIONS

International Search Report and Written Opinion dated Jan. 27, 2014 for corresponding International Patent Application No. PCT/EP2013/076071, European Patent Office, P.B. 5818 Patentlaan 2 NL-2280 HV Rijswijk.

*Primary Examiner* — Kyle Grabowski
(74) *Attorney, Agent, or Firm* — The Jansson Firm; Pehr B. Jansson

(57) ABSTRACT

The present invention relates to a method (100) for personalizing a document, said document comprising a support comprising printed patterns (201, 202), wherein said method (100) comprises generating at least a laser pulse on said support for carbonizing at least a printed pattern.

8 Claims, 2 Drawing Sheets

(51) Int. Cl.
  *B42D 25/387*    (2014.01)
  *B42D 25/337*    (2014.01)
  *B41M 5/24*      (2006.01)
  *B41F 23/08*     (2006.01)
  *B41J 11/00*     (2006.01)
  B41M 3/14        (2006.01)
  B23K 26/00       (2014.01)

(56) References Cited

U.S. PATENT DOCUMENTS

2007/0274559 A1* 11/2007 Depta .................... B42D 25/29
                                                    382/100
2008/0134920 A1*  6/2008 Foresti .................. B42D 25/29
                                                    283/72
2011/0156382 A1*  6/2011 Uyttendaele ........... B42D 25/00
                                                    283/91
2013/0314728 A1* 11/2013 Weaver ................. B42D 25/00
                                                    358/1.6

* cited by examiner

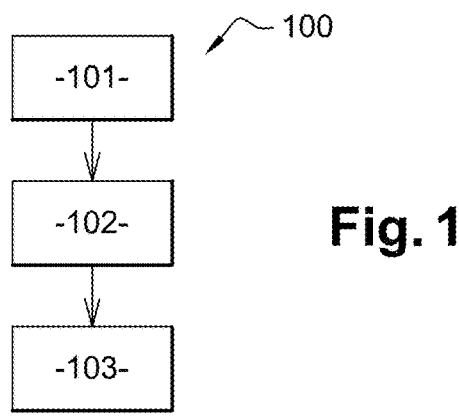
Fig. 1
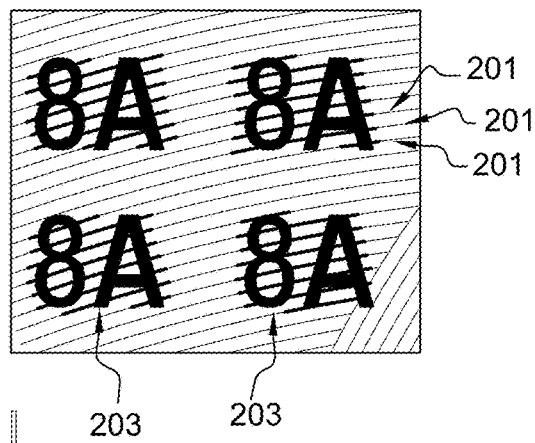
Fig. 2
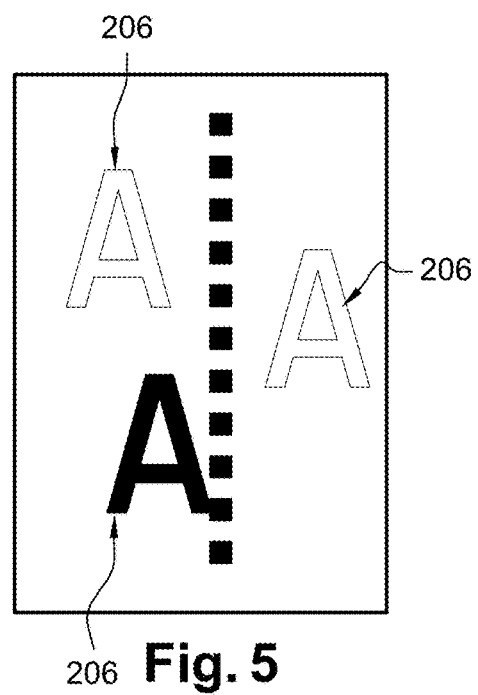
Fig. 4
Fig. 5

Fig. 3

SECURE LASER MARKING PERSONALISATION

FIELD OF THE INVENTION

The present invention relates to official documents, such as an ID card, a passport or all laminated documents, and more particularly to methods for personalizing these documents.

BACKGROUND

Personalization of an official document is generally realized by a laser, which marks personalized elements, such as a name, a social security number, a validity date, etc, on the document body. Because of the value and importance associated with these data carriers, they are often subject of unauthorized copying and forgeries. As a consequence, security is one of the highest challenges for official documents.

To prevent counterfeiting activities, an official document must have sufficient observable security features to allow quick visual verification. Security elements such as guilloches are generally used to provide effective protection. Guilloches are precise and intricate repetitive patterns printed with ink on the document body or on specific layers laminated over said body, which prevent forged copies. Micro texts printed with ink all over an area of the document body or overlays can also be used as security elements. Many other security elements exist, such as Moiré patterns or Rainbow printing which is color variation on printed lines.

Pattern ink is either a standard ink, or a special ink such as an optical variable ink (OVI) which is an ink whose color changes with the observation angle, an infrared ink or an ultraviolet ink.

The printing process is inkjet process printing, offset process printing, flexographic printing, silkscreen printing or rainbow printing.

However, security is never optimal because counterfeiters always find how to copy and imitate or duplicate the security elements. Improving security features is a constant need for rendering counterfeiting more and more difficult.

SUMMARY

It is an object of the invention to describe a method for personalizing an official document, which reinforces the security elements.

To this end, the invention provides a method for personalizing a document, said document comprising a support comprising printed patterns, wherein said method comprises generating at least a laser pulse on said support for carbonizing at least a printed pattern.

Thus, printed patterns, which are security elements, are affected by the laser. As a consequence, the document is useless for another person: if a counterfeiter would like to erase a personalization element, he has to erase the security elements too, because some printed patterns have carbonized on the support and got a change of color. Thanks to this method, the visual aspect of the personalization of an official document is different: some printed patterns are impacted by the personalization, which is visible naked-eye. The laser dots allow personalizing at the same time the card support and carbonizing the ink which becomes darker than initially. Moreover, carbonization arrives as soon as the printed pattern is touched by the laser dot, which is really fast. The carbonization is then guided into the printed pattern.

According to not limited embodiments, the method can comprise one or more of the following additional characteristics:
  patterns are printed by an offset process or an inkjet process.
  the patterns ink is an optical variable ink, an ultraviolet ink, or an infrared ink.
  the laser is a green laser or an ultraviolet laser.
  printed patterns comprise micro characters or micro shapes, and the method comprises a preliminary step of printing said micro characters or micro shapes such that the carbonization reveals a set of micro characters forming a control code.
  the pulse power is comprised between 500 W and 50 kW, and the pulse lasts between some nanoseconds to some microseconds.

The invention also provides a support comprising printed patterns, wherein at least a printed pattern is carbonized.

According to not limited embodiments, the document can comprise one or more of the following additional characteristics:
  the patterns ink is an optical variable ink, an ultraviolet ink, or an infrared ink.
  the printed patterns comprise micro characters or micro shapes.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 shows a flowchart which illustrates a method for personalizing an official document, according to an embodiment of the invention;

FIG. 2 schematically illustrates a part of a document comprising printed patterns and a personalization element;

FIG. 3 schematically illustrates a part of a document comprising printed patterns and a personalization element;

FIG. 4 schematically illustrates an enlargement of the a part of FIG. 3;

FIG. 5 schematically explicated the principle of printed pattern carbonization thanks to laser dots.

DESCRIPTION OF EMBODIMENTS

In the following description, well-known functions or constructions by the man skilled in the art are not described in detail since they would obscure the invention in unnecessary detail.

FIG. 1 is a flowchart illustrating a method 100 for personalizing an official document according to a non limited embodiment of the invention.

The method 100 applies to an official document comprising a support comprising printed patterns. Pattern ink is either a standard ink, or a special ink such as an optical variable ink (OVI) which is an ink whose color changes with the observation angle, an infrared ink or an ultraviolet ink. Besides, the printing process is inkjet process printing, offset process printing, flexographic printing, silkscreen printing or rainbow printing.

Figure 3:
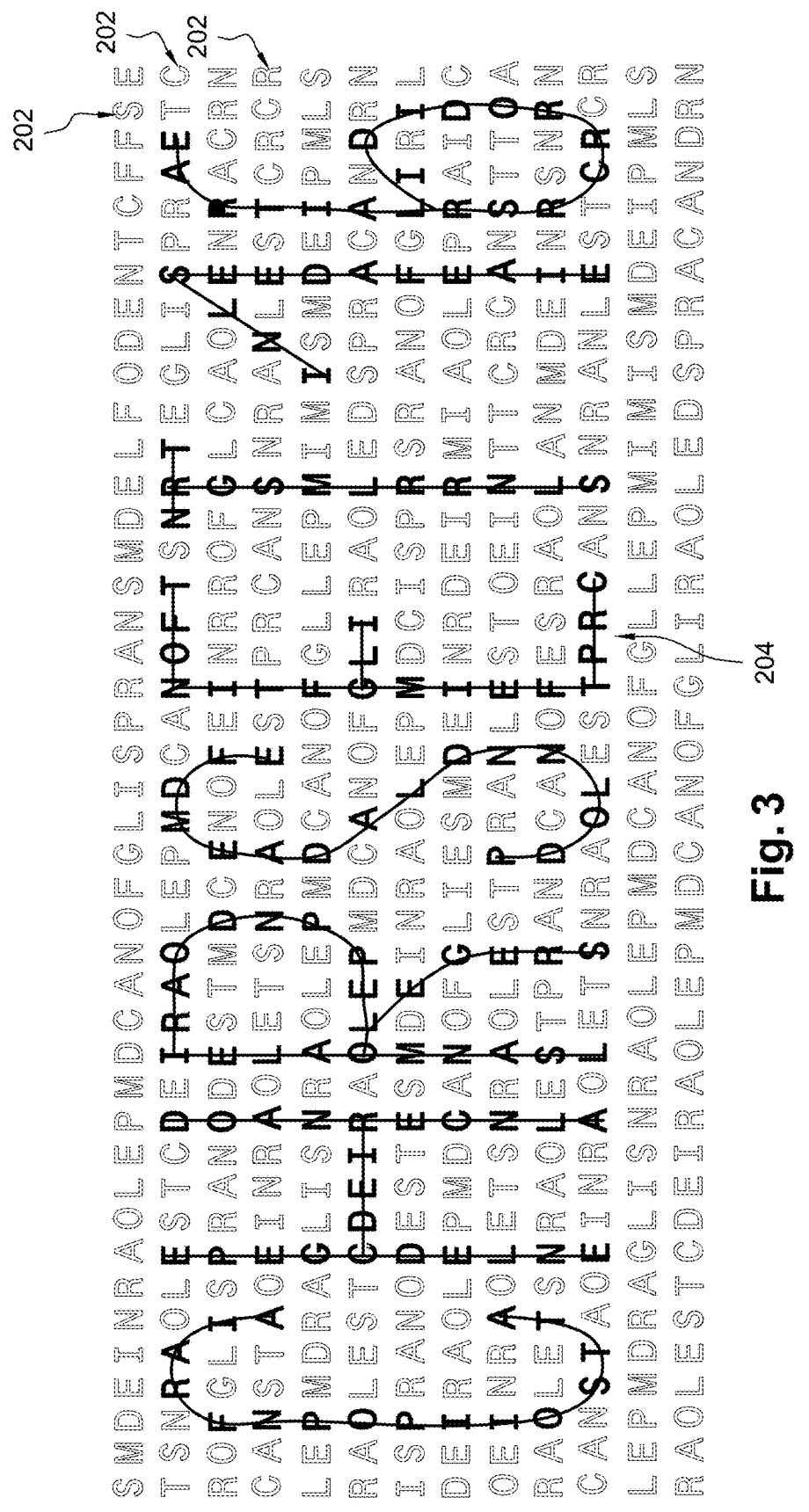

These printed patterns are for example guilloches or micro texts printed all over the support. FIG. 2 shows an example wherein printed patterns are guilloches 201, and FIGS. 3 and 4 shows an example wherein printed patters are micro characters 202 forming a micro text. However, printed patterns can also be micro shapes, for example rectangles, squares or circles, Moiré pattern or changing patterns.

It is to be noted that the printed patterns are reproduced on an area of the support or on the whole surface of the support. The printed patterns are defined by their form, and possibly comprise information, for example an alphanumerical symbol.

The method 100 comprises:

A first step 101 of selecting a high-powered laser, for example a green laser or an UV laser.

A second step 102 of selecting a pulse power for this laser, able to activate the auto-carbonization of the ink.

A third step 103 of marking a personalization element on the support by means of successive laser pulses, the laser selected in the first step working at the pulse power selected in the second step. It is to be noted that the marking is generally realized through a transparent overlay laminated over the support. The laser pulse is activated during a few nanoseconds, for example ten nanoseconds, to the peak power of several kilowatts, for example two kilowatts.

With this enough powerful laser pulse, if an area comprising ink is touched by at least a laser dot, the ink start to carbonize and the carbonization propagates in the pattern. The carbonization does not impact the areas of the support which do not carry any ink. As a consequence, some printed patterns become darker than initially. The carbonized printed patterns are kind of supplementary security elements for the official document: personalization elements are linked to printed patterns.

FIG. 2 shows four "8A" characters 203, which are example of personalization elements. It is to be noted that the guilloches 201 are carbonized around the "8A" characters 203. The carbonization is represented by widening the guilloche line more than reality for rendering them visible on a black and white drawing. Indeed, the ink of the guilloches 201 has reacted to the laser pulse, and has carbonized. The carbonization has spread around the laser personalization area. It is to be noted that the carbonization can spread differently into the guilloches 201 for the "8A" characters 203, depending of the pulse power. Indeed, the pulse power necessary for causing carbonization is specific to ink reactivity. Reproducing the same laser power for causing carbonization is not so easy and that also constitute a security against modification of a document.

FIG. 3 shows a "CHRSET 16" inscription 204 which is an example of a personalization element, and FIG. 4 is an enlargement of the "C" letter 205 of the "CHRSET 16" inscription 204. It is to be noted that all micro characters 202 whose a part is located on the laser dots forming the "C" letter 205 are carbonized, as it is schematically explained in FIG. 5. The other micro characters 202 are not carbonized. FIG. 5 shows three "A" micro letters 206, one of which is carbonized because it has an intersection with a laser dot.

Indeed, the ink of this micro character 206 has crossed a laser dot, and has reacted to the laser pulse. As a consequence, the micro character 206 has carbonized completely. The carbonization has then spread in the micro character 206 fully.

Moreover, in a not limited embodiment, the method 100 can comprise a supplementary step of determining some micro characters to carbonize. The determination is realized through an algorithm, and letters are reached by the laser thanks to a camera and a set of mirrors. This allows hiding some messages in the micro text, carbonized micro characters appearing randomly burned for a person who does not know the algorithm.

The invention claimed is:

1. A method for personalizing a document, said document comprising a support comprising a plurality of micro-character patterns of ink, wherein said method comprises generating at least a laser pulse on said support for carbonizing at least one micro-character pattern of ink, whereby if an area of a micro-character pattern is touched by at least a laser dot, carbonization of the ink propagates in the full micro-character pattern area, that is made darker, and does not propagate to areas of the support that do not carry ink, such that the carbonization of several micro-characters among a plurality of micro-characters form a chain of darkened alphanumeric micro-characters forming a control code.

2. The method according to claim 1, wherein the patterns are patterns printed by an offset process or an inkjet process.

3. The method according to claim 1, wherein the patterns are printed using an ink selected from the group consisting of an optical variable ink, an ultraviolet ink, and an infrared ink.

4. The method according to claim 1, wherein the laser pulse is a green laser or an ultraviolet laser.

5. The method according to claim 1, wherein the pulse power is comprised between 500 W and 50 kW, and the pulse lasts between some nanoseconds to some microseconds.

6. A document comprising a support comprising printed patterns, wherein at least one printed pattern is carbonized by generating at least a laser pulse on said support for carbonizing at least one micro-character pattern of ink, whereby if an area of a micro-character pattern is touched by at least a laser dot, carbonization of the ink propagates in the full micro-character pattern area, that is made darker, and does not propagate to areas of the support that do not carry ink, such that the carbonization of several micro-characters among a plurality of micro-characters form a chain of darkened alphanumeric micro-characters forming a control code.

7. The document according to claim 6, wherein the pattern ink is an optical variable ink, an ultraviolet ink, or an infrared ink.

8. The document according to claim 6, wherein the printed patterns comprise micro characters or micro shapes.

\* \* \* \* \*